(12) United States Patent
Maguire et al.

(10) Patent No.: US 8,011,904 B2
(45) Date of Patent: Sep. 6, 2011

(54) GAS FEED ASSEMBLY

(75) Inventors: Alan R Maguire, Derby (GB); Matthew W Whellens, Ehrendingen (CH); Glenn A Knight, Derby (GB)

(73) Assignee: Rolls-Royce plc, London (GB)

( * ) Notice: Subject to any disclaimer, the term of this patent is extended or adjusted under 35 U.S.C. 154(b) by 621 days.

(21) Appl. No.: 11/544,597

(22) Filed: Oct. 10, 2006

(65) Prior Publication Data

US 2007/0092381 A1 Apr. 26, 2007

(30) Foreign Application Priority Data

Oct. 20, 2005 (GB) .................................. 0521332.7

(51) Int. Cl.
*F04B 23/04* (2006.01)
(52) U.S. Cl. ...................................................... 417/427
(58) Field of Classification Search .................. 417/287, 417/427; 454/71; 60/785; 244/58; 62/DIG. 5; B64D 13/02
See application file for complete search history.

(56) References Cited

U.S. PATENT DOCUMENTS

| | | | | |
|---|---|---|---|---|
| 2,444,951 A * | 7/1948 | Paget | ............................ | 165/235 |
| 3,433,016 A * | 3/1969 | Borel | ......................... | 60/39.281 |
| 3,768,925 A | 10/1973 | Klemm | | |
| 4,480,654 A * | 11/1984 | Firey | ......................... | 137/119.09 |
| 5,161,364 A * | 11/1992 | Bruun et al. | ..................... | 60/772 |
| 5,704,218 A * | 1/1998 | Christians et al. | .............. | 62/172 |
| 6,415,621 B2 * | 7/2002 | Buchholz et al. | ............... | 62/402 |
| 6,908,062 B2 * | 6/2005 | Munoz et al. | .............. | 244/118.5 |
| 7,171,819 B2 * | 2/2007 | Lui et al. | ......................... | 62/172 |

FOREIGN PATENT DOCUMENTS

| | | |
|---|---|---|
| CH | 557 473 | 12/1974 |
| EP | 1 519 081 | 3/2005 |
| GB | 358 787 | 10/1931 |
| GB | 875 439 | 8/1961 |
| GB | 1 021 921 | 3/1966 |
| JP | 59128994 | 10/1989 |
| SU | 631 680 | 11/1978 |

* cited by examiner

*Primary Examiner* — Devon C Kramer
*Assistant Examiner* — Bryan Lettman
(74) *Attorney, Agent, or Firm* — Jeffrey S. Melcher; Manelli Selter PLLC

(57) ABSTRACT

A gas feed assembly (30) comprises a compressor arrangement (32) comprising first and second compressor (34, 36). The gas feed assembly includes an outlet (42) for gas for the first and second compressors (34, 36). The gas feed assembly includes a first inlet (38) for the first compressor (34) and a second inlet (40) for the second compressor (36). The gas feed assembly further includes a valve assembly (52, 64) for allowing gas to enter either, or both, of the first and second compressors from at least one gas source.

4 Claims, 4 Drawing Sheets

GAS FEED ASSEMBLY

FIELD OF THE INVENTION

The present invention relates to gas feed assemblies. More particularly, but not exclusively, the invention relates to gas feed assemblies for providing pressurised air to the cabin of an aircraft.

BACKGROUND OF THE INVENTION

In order to maintain the comfort of passengers and the cabin crew on an aircraft, it is necessary to ensure that the cabin is pressurised. The air used to pressurise the cabin is generally taken from the engine. However, since the operation of the engine is not constant, and flow rates and pressures can vary depending upon the engine's speed, there can be problems associated with ensuring that the correct flow rate of air to the cabin is delivered.

SUMMARY OF THE INVENTION

According to one aspect of this invention, there is provided a gas feed assembly comprising a compressor arrangement having a plurality of compressors, outlet means for gas from the plurality of compressors, a plurality of inlets for each compressor, and the gas feed assembly further comprising a valve assembly for allowing gas to enter at least one of the compressors from at least one gas source.

In one embodiment, the compressor arrangement comprises first and second compressors, a first inlet for the first compressor, and a second inlet for the second compressor. The valve assembly may be configured to allow gas to enter either, or both, of the first and second compressors from at least one gas source.

Preferably, the gas feed assembly comprises a gas source selector for selecting the gas source form from a plurality of gas sources. The gas source selector may comprise a main valve.

The valve assembly may comprise a first inlet valve mounted on the first inlet. The first inlet valve may be operable to allow gas to enter the first inlet. The valve assembly may further comprise a second inlet valve mounted on the second inlet. The second inlet valve may be operable to allow gas to enter the second inlet.

Alternatively, the valve assembly may comprise an inlet selector valve mounted on the compressor arrangement. The inlet selector valve may be operable between a first condition for allowing gas to enter the first inlet, a second condition for allowing gas to enter the second inlet, and a third condition for allowing gas to enter the first and second inlets.

Preferably, when the inlet selector valve is in the first condition, the first inlet is open and the second inlet is closed. Preferably, when the inlet selector valve is in the second condition, the second inlet is opened and the first inlet is closed. Preferably, when the inlet selector valve is in the third condition, the first and second inlets are open.

In one embodiment, the first compressor may be a centrifugal compressor. In this embodiment, the second compressor may also be a centrifugal compressor. In one or more further embodiments, the compressors may additionally or alternatively comprise one or more of a scroll compressor, an axial flow compressor or a mixed flow compressor. In these embodiments, the type of compressor selected may be dependent upon the requirements of air flow and pressure rise.

The first and second compressors may be configured such that the first compressor can operate over a first range of flow rates. The first and second compressors may be configured such that the second compressor can operate over a second range of flow rates. The first and second compressors may be configured such that both compressors together can operate over a third range of flow rates. The first range of flow rates are lower than the second range of flow rates and the second range of flow rates are lower than the third range of flow rates. The first range of flow rates may overlap the second range of flow rates, and the second range of flow rates may overlap the third range of flow rates.

The first and second compressors may be arranged back to back. The first and second compressors may be fixedly mounted on each other for rotation together. Thus, in the preferred embodiment, the first and second compressors rotate at the same angular velocity as each other.

The first and second compressors may be configured to provide generally the same pressure rise as each other for the flow rates for which each compressor is respectively configured.

The gas feed assembly may comprise at least one further compressor in addition to the aforesaid first and second compressors. If desired, the gas feed assembly may comprise a plurality of further compressors in addition to the aforesaid first and second compressors.

The gas feed assembly may comprise at least one further inlet for the compressors. If desired, the gas feed assembly may comprise a plurality of further inlets for the compressors in addition to the aforesaid first and second inlets.

Where the gas feed assembly comprises a further compressor, the gas feed assembly may comprise a further inlet for the further compressor. Where the gas feed assembly comprises a plurality of further compressors, the gas feed assembly may comprise a plurality of further inlets such that a further inlet is provided for each respective further compressor.

The gas feed assembly may include a manifold to feed gas to the compressors via the respective inlet. Each compressor may be provided with a respective inlet valve at its inlet.

The, or each, further compressor may be configured to operate respectively over a desired range of flow rates. Each compressor may be configured to operate over a different range of flow rates to the other compressors. The compressors may be configured such that a plurality of compressors can operate together over respective further ranges of flow rates.

The gas feed assembly may be incorporated in a gas turbine engine. The gas source selector may be selectively connectable to a first gas source, which may comprise a supply of air at ambient pressure or a boundary layer of air. The gas source selector may be selectively connectable to a second gas source, which may comprise a supply of air compressed to a first pressure, for example by a fan of the engine. The gas source selector may be selectively connectable to a third gas source which may comprise a supply of air compressed to a second pressure greater than the first pressure, for example a compressor of the engine. The compressor may be an intermediate pressure compressor, for example the eighth stage of the intermediate pressure compressor.

The first and second compressors may be mounted on a common shaft for rotation about the axis of the shaft. The shaft may be connected to a gear box for varying the speed of rotation of the shaft.

In the preferred embodiment, the gas feed assembly may comprise a cabin feed air assembly for an aircraft. In this embodiment the cabin air feed assembly is configured to provide suitable pressurisation to the cabin of the aircraft.

The gas feed assembly may comprise drive means to drive the first and second compressors. The drive means may comprise an interconnecting shaft arrangement to connect the first and second compressors to a main shaft of the gas turbine engine, for example to an intermediate pressure shaft of the engine.

The assembly may include a cooler to cool air from the outlet prior to being introduced into the cabin. The cooler may comprise a heat exchanger. The cooler may include a supply of air from the fan to cool air from the outlet of the compressor arrangement.

BRIEF DESCRIPTION OF THE DRAWINGS

An embodiment of the invention will now be described by way of example only, with reference to the accompanying drawings, in which.

DETAILED DESCRIPTION OF THE INVENTION

Figure 1:
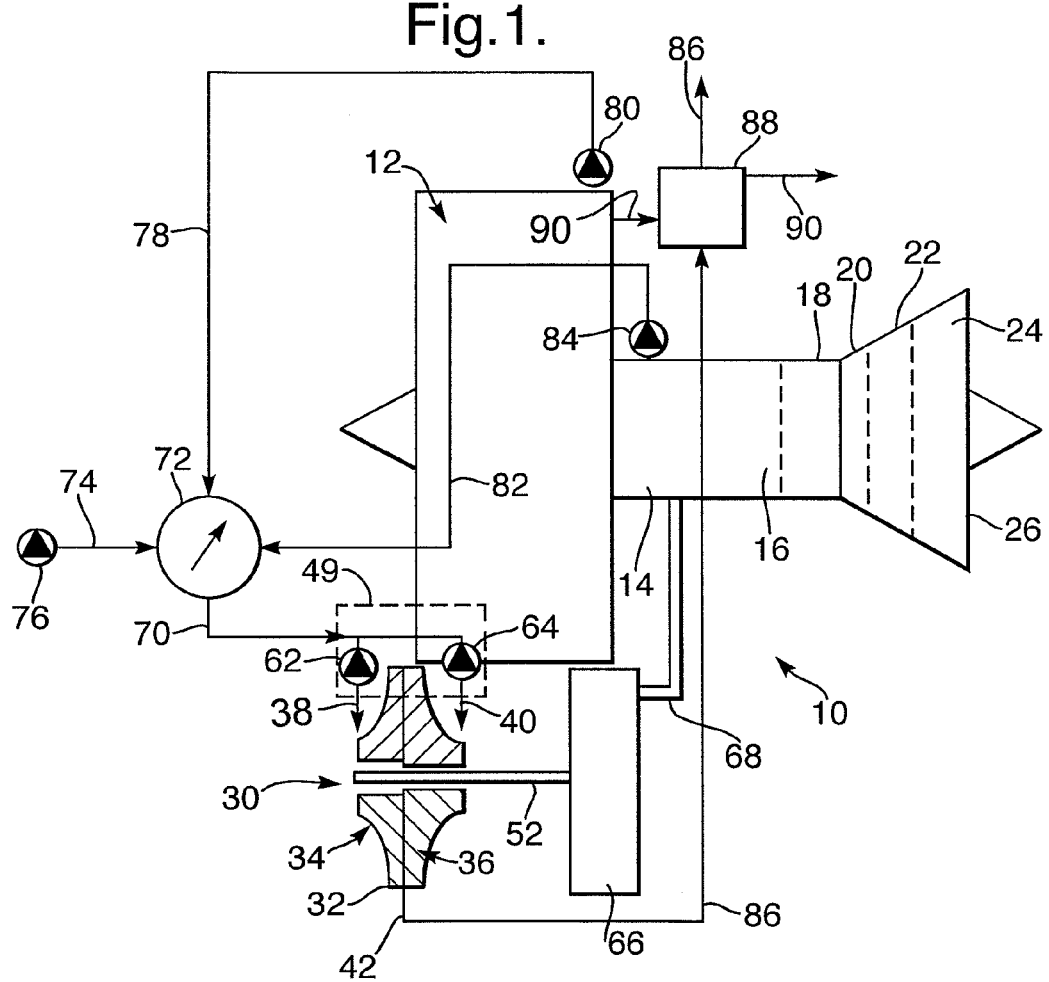
FIG. 1 is a diagrammatic side view of a gas turbine engine incorporating a gas feed assembly.

Referring to FIG. 1, there is shown diagrammatically a gas turbine engine 10 which comprises in axial flow series, a fan 12, an intermediate pressure compressor 14, a high pressure compressor 16, a combustion arrangement 18, a high pressure turbine 20, an intermediate pressure turbine 22, and a low pressure turbine 24. At the rear of the engine 10 there is provided an exhaust 26.

Air flowing through the engine 10 is driven by the fan 12 which splits the air into two components, a first outer component which provides the thrust for the engine, and a second inner, or core, component which passes into the intermediate pressure compressor 14 and then into the high pressure compressor 16. Air from the high pressure compressor 16 then passes into the combustion arrangement 18 where it is mixed with fuel and ignited. Air expands out of the combustion arrangement 18 into the high pressure turbine 20 and then through the intermediate pressure turbine 22 and the low pressure turbine 24 which respectively drive the high pressure compressor 16, intermediate pressure compressor 14, and the fan 12 by suitable interconnecting shafts.

The engine 10 is generally used to provide the thrust for aircraft and it is also used for various ancillary functions, one of which being to provide pressurised air to the cabin of the aircraft. In the preferred embodiment of the present invention, air is delivered to the cabin of the aircraft via a gas feed assembly generally designated 30. The gas feed assembly 30 comprises a compressor arrangement 32 comprising a first centrifugal compressor 34 which is fixedly mounted back to back to a second centrifugal compressor 36.

The first centrifugal compressor 34 has an inlet 38, and the second centrifugal compressor 36 has an inlet 40.

Figure 2:
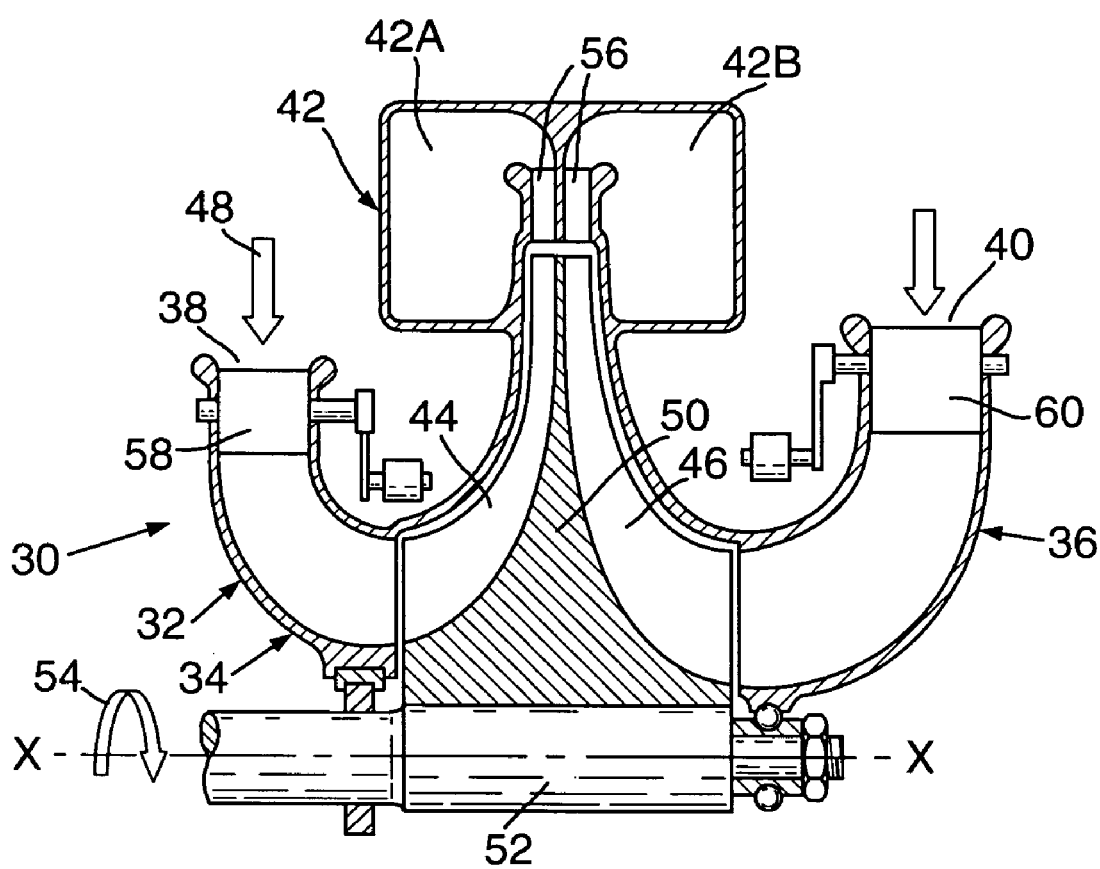
FIG. 2 is a sectional side view of the upper half of a compressor arrangement.

The first and second compressors 34, 36 have a common outlet 42 such that compressed air from either or both of the first and second compressors 34, 36 can leave the compressor arrangement 30 via the outlet 42. A sectional view of the upper half of the compressor arrangement 30 is shown in FIG. 2.

The first compressor 34 comprises a plurality of first vanes 44, and the second compressor 36 comprises a plurality of second vanes 46. The first vanes 44 and the second vanes 46 are fixedly connected to each other by a central support 50. The central support 50 and the first and second vanes, 44, 46 are mounted on a common shaft 52 having an axis X-X. The shaft 52 is rotated as shown in the direction of the arrow 54 via a connection to the intermediate pressure shaft of the gas turbine engine 10, which will be explained below. The rotation of the shaft 52 rotates the plurality of first and second vanes 44, 46 in the direction of the arrow 54 to compress air 48 passing through the first and second compressors 34, 36 to the outlet 42.

The outlet 42 comprises a twin air outlet volute diffuser and comprises a first outlet section 42A for the first compressor 34, and a second outlet section 42B for the second compressor 36. At the outlet region of the first and second compressors 34, 36, there is provided radial diffusers 56 to diffuse the air passing into the outlet 42.

The first compressor 34 is provided with inlet guide vanes 58 to provide appropriate swirl to the air entering the first compressor 34. Similarly, the second compressor 36 has inlet guide vanes 60 at the inlet 40 to provide suitable swirl to the air passing into the second compressor 36.

Referring back to FIG. 1, the inlet 38 of the first compressor 34 is provided with an inlet valve 62, and the second inlet 40 to the second compressor 36 is provided with an inlet valve 64. Alternatively, an inlet selector valve 49 (shown schematically in broken lines in FIG. 1) can be provided. The inlet selector valve 49 is operable between a first condition for allowing air to enter the first inlet 38, a second condition for allowing air to enter the second inlet 40 and a third condition for allowing air to enter the first and the second inlets 38, 40. The shaft 52 extends to a gear box 66. The gear box 66 is connected by a shaft arrangement 68 to the intermediate pressure shaft of the engine 10. The intermediate pressure shaft connects the intermediate pressure turbine 22 to the intermediate pressure compressor 14. A suitable arrangement for the shaft arrangement 68 is described in published patent application No. EP1519081, the contents of which are incorporated.

The first and second inlets, 38, 40 are connected via the valves 62, 64 to a feed line 70, which, in turn, is connected to a main selector valve 72.

An ambient air feed line 74 extends from an ambient air feed valve 76 to feed air to the main selector valve 72. A first compressed air feed line 78 is connected via a first compressed air feed valve 80 to a region of the fan 12 whereby air compressed by the fan 12 can be fed to the main selector valve 72.

Alternatively, the first gas source may be a supply of air from a boundary layer flowing over an internal or external surface of any component of the group comprising and airframe, a nacelle or an engine 10. As is well known to the skilled artisan removing the boundary layer from a surface over which a main airflow travels can improve the efficiency of a system to which the surface is associated or improve the main airflow's characteristics.

A second compressed air feed line is 82 is connected by a second compressed air feed valve 84 to the intermediate pressure compressor 14, in particular the eighth stage of the intermediate pressure compressor 14, such that air compressed by the intermediate pressure compressor 14 is fed via the second compressed air feed line 82 to the main selector valve 72.

The main selector valve 72 is operable to select one of the ambient air feed lines 74, the first compressed air feed line 78, or the second compressed air feed line 82. Whichever of these feed lines 74, 78, 82 is selected will result in air being delivered at the appropriate pressure via the feed line 70 to the compressor arrangement 32.

The outlet 42 of the compressor arrangement 32 is connected via an outlet feed line 86 to a cooler 88. This enables air from the compressor arrangement 32 to be cooled. The cooler 88 is in the form of a heat exchanger and receives air from the fan 12 via the cooler feed line 90. The air passing along the outlet feed line 86 then passes to the cabin for pressurization purposes.

As can be seen, air can be supplied through the compressor arrangement 32 from one of three sources, as described above. The air passing along the inlet feed line 70 can be passed either to the first compressor 34, by opening the first compressor inlet valve 62 and closing the second compressor inlet valve 64. Alternatively, the air passing along the inlet feed line 70 can be passed to the second compressor 36 by opening the second inlet feed valve 64 and closing the first inlet feed valve 62. As a further alternative, the air can be passed to both the first and the second compressors 34, 36 by opening both of the first and second inlet feed valves 62, 64.

There is thus a choice of three possible sources of air and three possible pressures and flow rates to be supplied to the compressor arrangement 32. By selecting which of the first, second, or both compressors 34, 36, the air passing along the inlet feed line is fed to, then the pressure and flow rate of the air passing out of the compressor arrangement can be determined.

Figure 3:
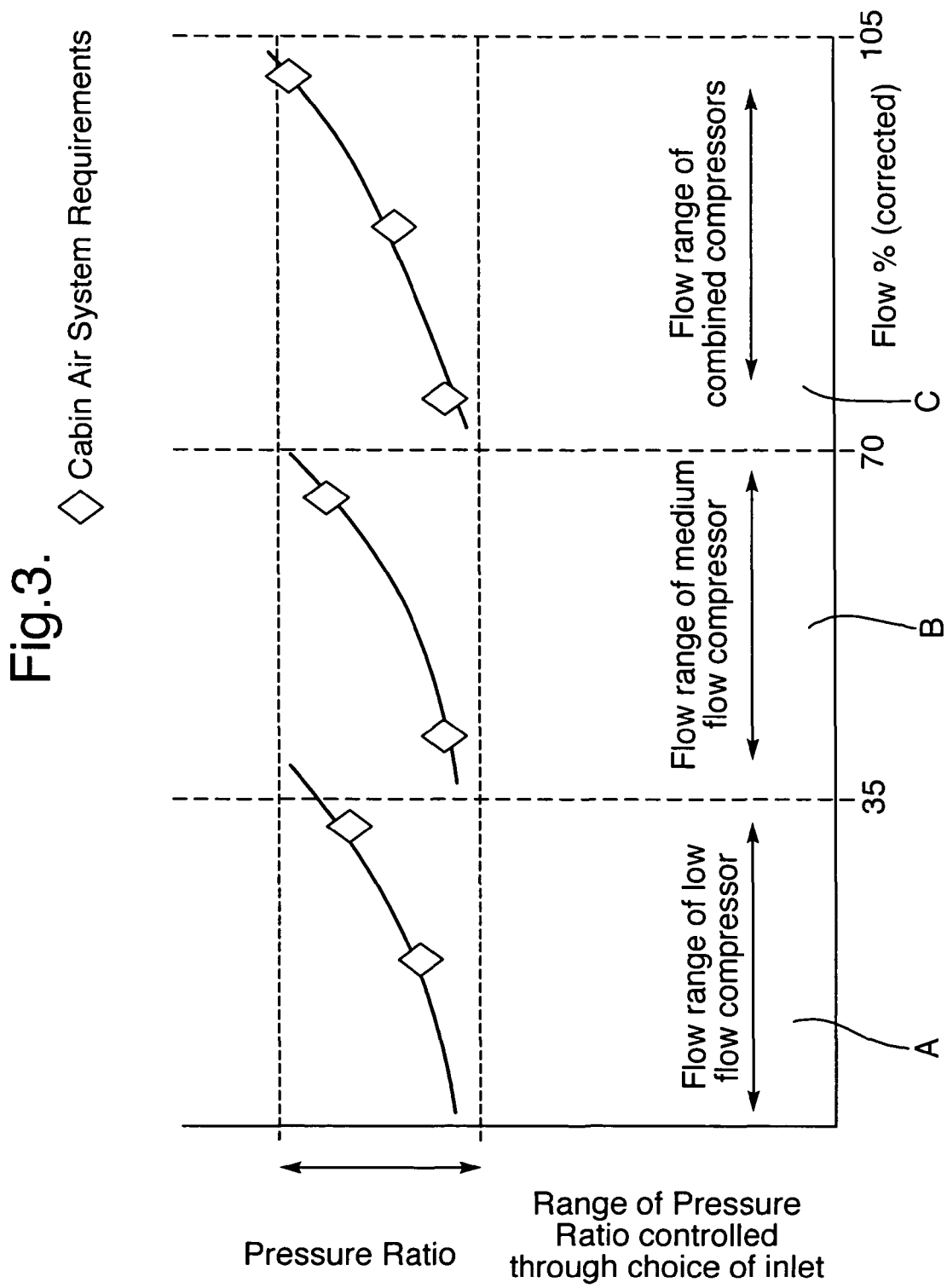
FIG. 3 is a graph showing flow rates and pressure ratios of the gas feed assembly.

Thus, at the various different modes of operation of the engine, the appropriate flow rate and pressure rise of air passing via the compressor arrangement 32 into the outlet feed line 86 and to the cabin can be selected. In this connection, reference is made to FIG. 3, which illustrates a graph showing the pressure ratios and flow percent of air passing through the compressor arrangement 32. The graph has three regions. The left hand region designated A represents air flowing through the first compressor 34 only. The middle region designated B shows air passing through the second compressor 36 only, and the right hand region designated C shows air passing through both of the first and second compressors 34, 36.

Figure 4:
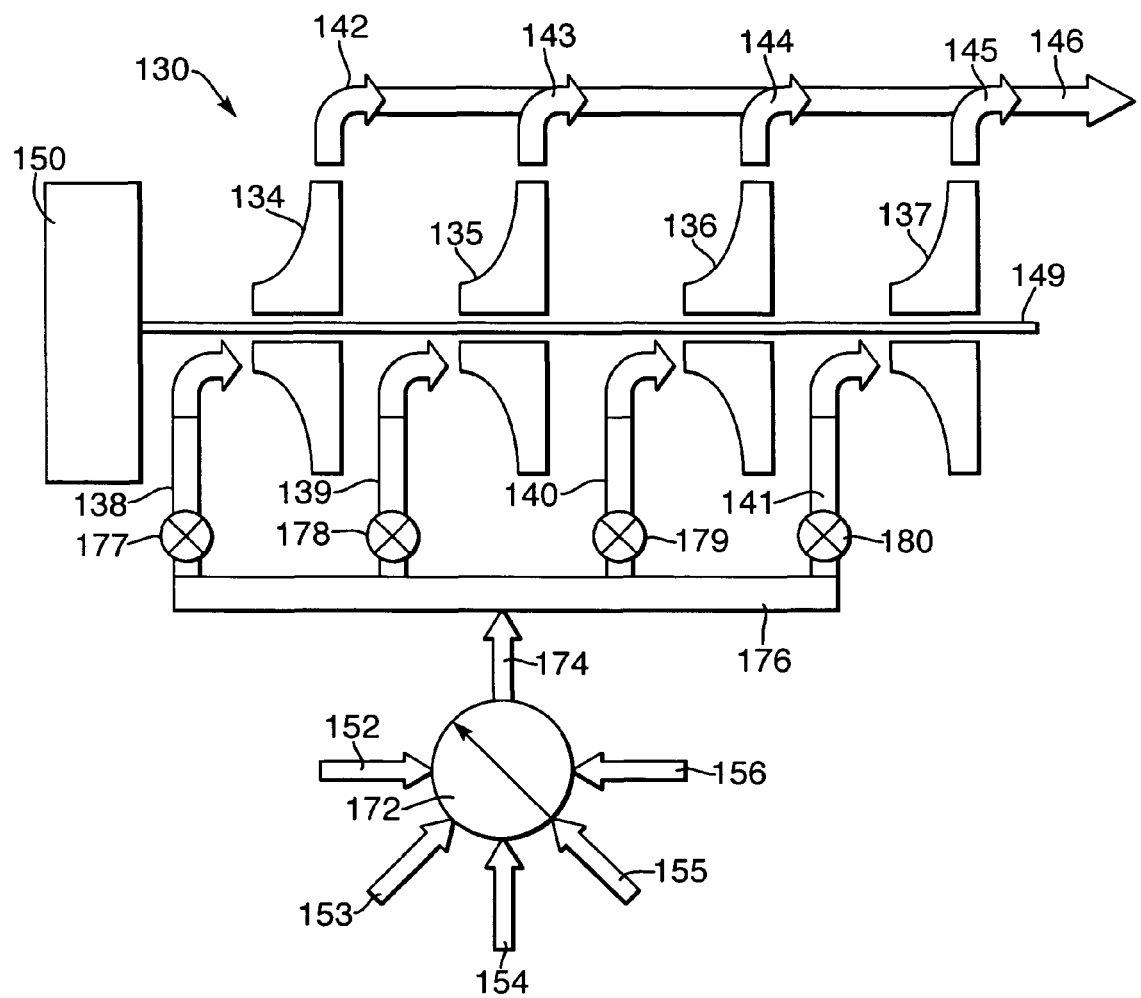
FIG. 4 is a diagrammatic side view of another embodiment of a gas feed assembly.

Referring to FIG. 4, there is shown a further embodiment of a gas feed assembly generally designated 130, which comprises a plurality of centrifugal compressors, namely a first centrifugal compressor 134 having an inlet 138, a second centrifugal compressor 135 having an inlet 139, a third centrifugal compressor 136 having an inlet 140, and a fourth centrifugal compressor 137 having an inlet 141.

The first, second, third and fourth centrifugal compressors 134, 135, 136 and 137 are coaxially mounted adjacent each other about a shaft 149 connected to a gearbox 150.

The first, second, third and fourth compressors 134, 135, 136 and 137 have respective first, second, third and fourth outlets 142, 143, 144, 145, each of which is in communication with an outlet manifold 146 to feed the compressed air to the aeroplane cabin, in a similar manner to that described above with reference to FIG. 1.

The gas feed assembly 130 further includes a main selector valve 172 for selecting from which of a plurality of feed lines designated 152, 153, 154, 155 and 156 air is fed to try compressors 134, 135, 136 and 137. The feed lines 152, 153, 154, 155 and 156 are connected in fluid communication to respective different regions of the engine to feed air to the gas feed assembly at different pressures.

The air is fed from the main selector valve 172 via a feed line 174 to an inlet manifold 176. The air is then passed from the inlet manifold 176 to one or more of the compressors 134, 135, 136 and 137 via inlet valves 177, 178, 179, 180 provided in the respective inlet lines 138, 139, 140 and 141.

There is thus described a simple and effective gas feed assembly for providing pressurised air to the cabin of an aircraft during the different wide range of operating conditions experienced by the aircraft's engines.

Various modifications can be made without departing from the scope of the invention.

We claim:

1. A method of supplying pressurized air to a cabin of an aircraft comprising:
   powering at least one compressor using power taken off of a gas turbine engine, wherein the at least one compressor is a cabin air compressor;
   supplying air to at least one inlet of the cabin air compressor from a source of air;
   using an air supply selector valve to select the source of air supplied to the inlet dependent on a desired cabin pressure, the supply selector valve being connected to and selectable between at least two air sources having different pressures and being selected from the group consisting of a gas turbine engine core compressor, a fan bypass air, ambient air, or a boundary layer flowing over an internal or external surface of any component of an airframe, a nacelle or the gas turbine engine; and
   supplying compressed air at the desired cabin pressure from at least one outlet of the cabin air compressor to the cabin to provide the desired cabin pressure, the desired cabin pressure being a pressure that maintains the comfort of passengers and cabin crew on the aircraft, wherein the at least one compressor comprises first and second compressors being mounted on a common shaft and driven by a gearbox, a first inlet for the first compressor, a second inlet for the second compressor, and using an inlet selector valve to allow gas to enter either, or both, of the first and second compressors from the at least two air sources.

2. A method according to claim 1, wherein the cabin air compressor provides substantially a same pressure differential rise to each of the different air sources.

3. A method according to claim 1, wherein the first and second compressors are operated at the same time and compressed air leaving the compressors is combined.

4. A method according to claim 1, wherein the first and second compressors provide different pressure rises.

* * * * *